(12) United States Patent
Heit et al.

(10) Patent No.: US 10,498,624 B2
(45) Date of Patent: Dec. 3, 2019

(54) SYSTEMS AND METHODS FOR ADAPTIVE ROUTER FAILOVER IN LINUX-BASED COMPUTING SYSTEMS

(71) Applicants: James R Heit, Roseville, MN (US); Robert L Bergerson, Roseville, MN (US); Jason C Schultz, Roseville, MN (US); John A Peters, Roseville, MN (US)

(72) Inventors: James R Heit, Roseville, MN (US); Robert L Bergerson, Roseville, MN (US); Jason C Schultz, Roseville, MN (US); John A Peters, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 56 days.

(21) Appl. No.: 14/874,617

(22) Filed: Oct. 5, 2015

(65) Prior Publication Data

US 2017/0099206 A1  Apr. 6, 2017

(51) Int. Cl.
*H04L 12/26* (2006.01)
*H04L 12/707* (2013.01)
*H04L 12/24* (2006.01)

(52) U.S. Cl.
CPC .......... *H04L 43/10* (2013.01); *H04L 41/0663* (2013.01); *H04L 45/22* (2013.01); *H04L 43/0805* (2013.01); *H04L 43/0823* (2013.01)

(58) Field of Classification Search
None
See application file for complete search history.

(56) References Cited

U.S. PATENT DOCUMENTS

| | | | |
|---|---|---|---|
| 10,084,718 B1* | 9/2018 | Abts | H04L 47/60 |
| 2007/0258508 A1* | 11/2007 | Werb | H04W 84/18 375/140 |
| 2008/0250267 A1* | 10/2008 | Brown | G06F 11/1482 714/4.1 |
| 2009/0013210 A1* | 1/2009 | McIntosh | H04L 41/0672 714/4.1 |
| 2014/0115706 A1* | 4/2014 | Silva | G06F 9/45533 726/23 |
| 2016/0226762 A1* | 8/2016 | Zhang | H04L 49/25 |

* cited by examiner

*Primary Examiner* — Mansour Oveissi

(57) ABSTRACT

Systems and methods for adaptive router failover in Linux-based computing systems are disclosed. Embodiments may include configuring a Linux-based computing system to have access to at least a first router and a second router. Embodiments may further include transmitting one or more data packets from the Linux-based computing system to another computing system via the first router. Embodiments may also include identifying a failure in the first router and, in response to identification of the failure in the first router, automatically switching use of the first router and second router by the Linux-based computing system. Embodiments may further include transmitting one or more data packets from the Linux-based computing system to another computing system via the second router after switching the use of the first router and second router by the Linux-based computing system.

20 Claims, 3 Drawing Sheets

SYSTEMS AND METHODS FOR ADAPTIVE ROUTER FAILOVER IN LINUX-BASED COMPUTING SYSTEMS

FIELD OF THE DISCLOSURE

The instant disclosure relates to computing systems in computer networks. More specifically, this disclosure relates to the implementation of adaptive router failover in Linux-based network computing systems.

BACKGROUND

Linux-based computing systems may be configured to use a router to communicate over a network. However, when the router fails, conventional Linux-based computing systems are unable to communicate over the network. Accordingly, conventional Linux-based computing systems are less than optimal.

SUMMARY

Linux-based computing systems that communicate over a network through routers may be improved by configuring them with systems and methods for adaptive router failover capable of allowing the Linux-based computing systems to continue to communicate over a network, via an alternate router, when a router fails. In particular, a method for adaptive router failover in Linux-based computing systems may include configuring a Linux-based computing system to have access to at least a first router and a second router. The method may also include transmitting one or more data packets from the Linux-based computing system to another computing system via the first router, wherein the second router is not used to transmit the one or more data packets while the first router is used to transmit the one or more data packets from the Linux-based computing system to another computing system. The method may further include identifying a failure in the first router. The method may also include, in response to identification of the failure in the first router, automatically switching use of the first router and second router by the Linux-based computing system. The method may further include transmitting one or more data packets from the Linux-based computing system to another computing system via the second router after switching the use of the first router and second router by the Linux-based computing system, wherein the first router is not used to transmit the one or more data packets while the second router is used to transmit the one or more data packets from the Linux-based computing system to another computing system.

According to another embodiment, a computer program product may include a non-transitory computer-readable medium including instructions which, when executed by a processor of a computing system, cause the processor to perform the step of configuring a Linux-based computing system to have access to at least a first router and a second router. The medium may also include instructions which, when executed by a processor of a computing system, cause the processor to perform the step of transmitting one or more data packets from the Linux-based computing system to another computing system via the first router, wherein the second router is not used to transmit the one or more data packets while the first router is used to transmit the one or more data packets from the Linux-based computing system to another computing system. The medium may further include instructions which, when executed by a processor of a computing system, cause the processor to perform the step of identifying a failure in the first router. The medium may also include instructions which, when executed by a processor of a computing system, cause the processor to perform the step of in response to identification of the failure in the first router, automatically switching use of the first router and second router by the Linux-based computing system. The medium may further include instructions which, when executed by a processor of a computing system, cause the processor to perform the step of transmitting one or more data packets from the Linux-based computing system to another computing system via the second router after switching the use of the first router and second router by the Linux-based computing system, wherein the first router is not used to transmit the one or more data packets while the second router is used to transmit the one or more data packets from the Linux-based computing system to another computing system.

According to yet another embodiment, an apparatus may include a memory and a processor coupled to the memory. The processor may be configured to execute the step of configuring a Linux-based computing system to have access to at least a first router and a second router. The processor may also be configured to execute the step of transmitting one or more data packets from the Linux-based computing system to another computing system via the first router, wherein the second router is not used to transmit the one or more data packets while the first router is used to transmit the one or more data packets from the Linux-based computing system to another computing system. The processor may be further configured to execute the step of identifying a failure in the first router. The processor may also be configured to execute the step of in response to identification of the failure in the first router, automatically switching use of the first router and second router by the Linux-based computing system. The processor may be further configured to execute the step of transmitting one or more data packets from the Linux-based computing system to another computing system via the second router after switching the use of the first router and second router by the Linux-based computing system, wherein the first router is not used to transmit the one or more data packets while the second router is used to transmit the one or more data packets from the Linux-based computing system to another computing system.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

By implementing adaptive router failover on a Linux-based computing system as disclosed herein the Linux-based computing system may be improved so as to allow the Linux-based computing system to continue communication over a network even when a router that was being used to manage the network communication has experienced a failure. For example, after a failure in a router currently being used to manage network communication is identified, the Linux-based computing system may be configured to use a second router to manage the network communication. In other words, the Linux-based computing system may switch the router which it utilizes to route and manage network traffic. With the switch in use between the routers, the Linux-based computing system may continue to communicate over the network using the second router. Most importantly, the Linux-based computing system is able to continue to communicate over the network despite the router which was previously being used to manage network communication experiencing operation failure.

Figure 1:
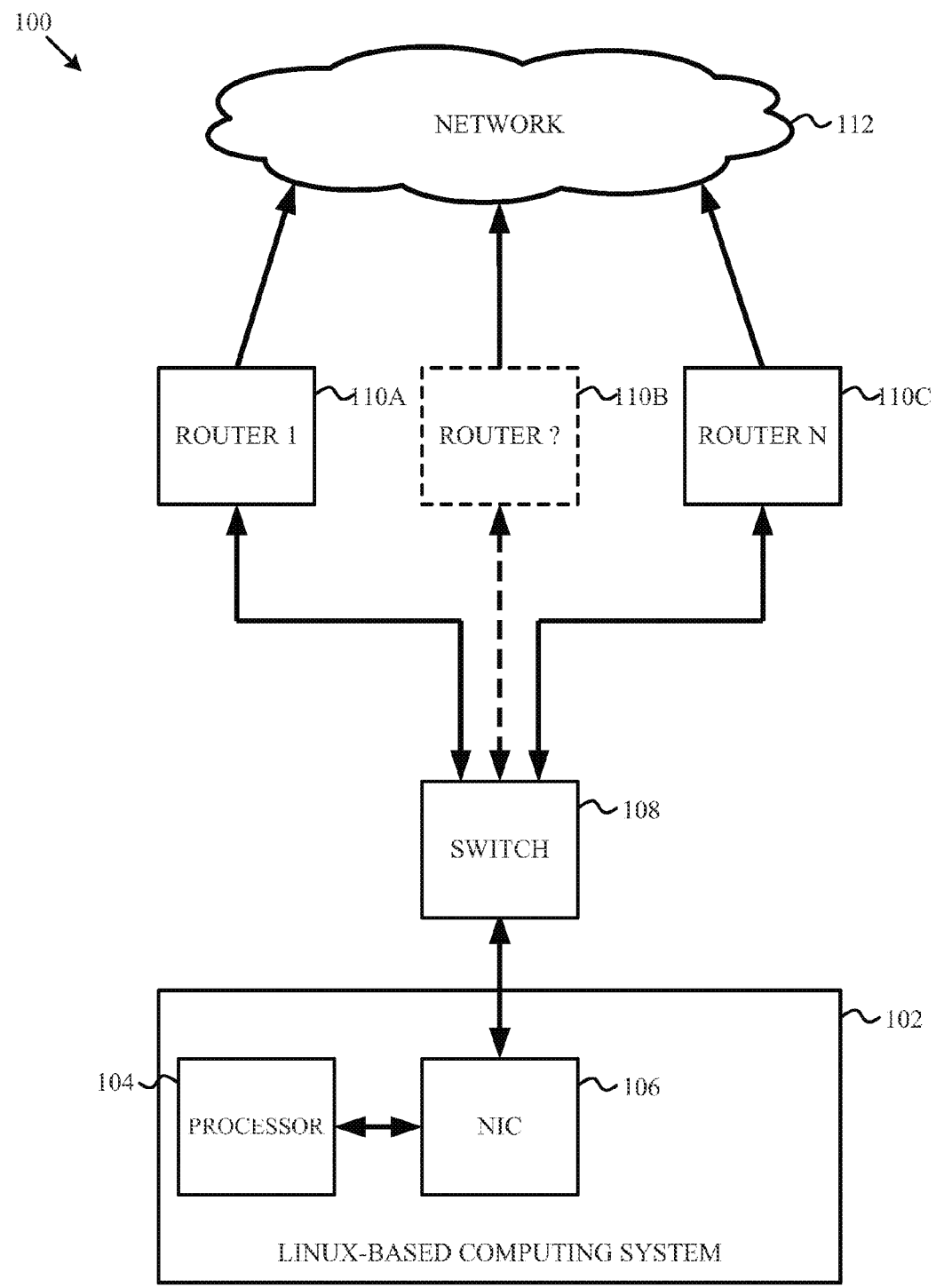
FIG. 1 is a schematic block diagram illustrating a system for adaptive router failover in Linux-based computing systems according to one embodiment of the disclosure.

FIG. 1 is a schematic block diagram illustrating a system for adaptive router failover in Linux-based computing systems according to one embodiment of the disclosure. The system 100 includes a Linux-based computing system 102 that includes a processor 104 and network interface card (NIC) 106. In some embodiments, the Linux-based computing system 102 may include a computing system configured with a Linux operating system (OS). The processor 104 may include one or more processors operating in series and/or parallel to execute instructions of the Linux-based computing system 102. The NIC 106 may include a component housed within the Linux-based computing system 102 or coupled to the Linux-based computing system 102 that is configured to connect the Linux-based computing system 102 to a communication network, such as communication network 112.

As illustrated in the embodiment of FIG. 1, the NIC 106 may connect the Linux-based computing system 102 to the communication network 112 through a switch 108 and routers 110. The switch 108 may include a component coupled to the NIC 106 and a plurality of routers 110 that is capable of switching between the routers 110. For example, in one embodiment, the switch 108 may be configured to couple NIC 106 to router 110A so that communication between the Linux-based computing system 102 and the network 112 is managed by router 110A. In another embodiment, the switch 108 may be configured to couple NIC 106 to router 110C so that communication between the Linux-based computing system 102 and the network 112 is managed by router 110C. According to an embodiment, the switch 108 may be coupled to N routers 110A-110C, thus switch 108 is not limited to coupling with only three routers. Nor is switch 108 limited to coupling to only a single NIC as one of skill in the art would readily recognize that, in general, a router switch may be coupled to one or more NICs and one or more routers.

Routers 110 may include one or more networking devices, each configured to manage the transfer of data packets between the Linux-based computing system 102 and communication network 112. In the embodiment of FIG. 1, the system 100 includes three routers 110A-110C so that the variable N is 3. However, in other embodiments, N may be any number of routers which may be coupled to the Linux-based computing system 102.

The communication network 112 may facilitate communications of data between different computing systems communicating over the network 112, such as the Linux-based computing system 102. In some embodiments, the network 112 may include a switched fabric computer network communications link to facilitate communication between servers/processors, also referred to as data storage nodes. The network 112 may include any type of communications network including, but not limited to, a direct PC-to-PC connection, a local area network (LAN), a wide area network (WAN), a modem-to-modem connection, the Internet, an Intranet, a combination of the above, or any other communications network now known or later developed within the networking arts which permits two or more computers to communicate.

Figure 2:
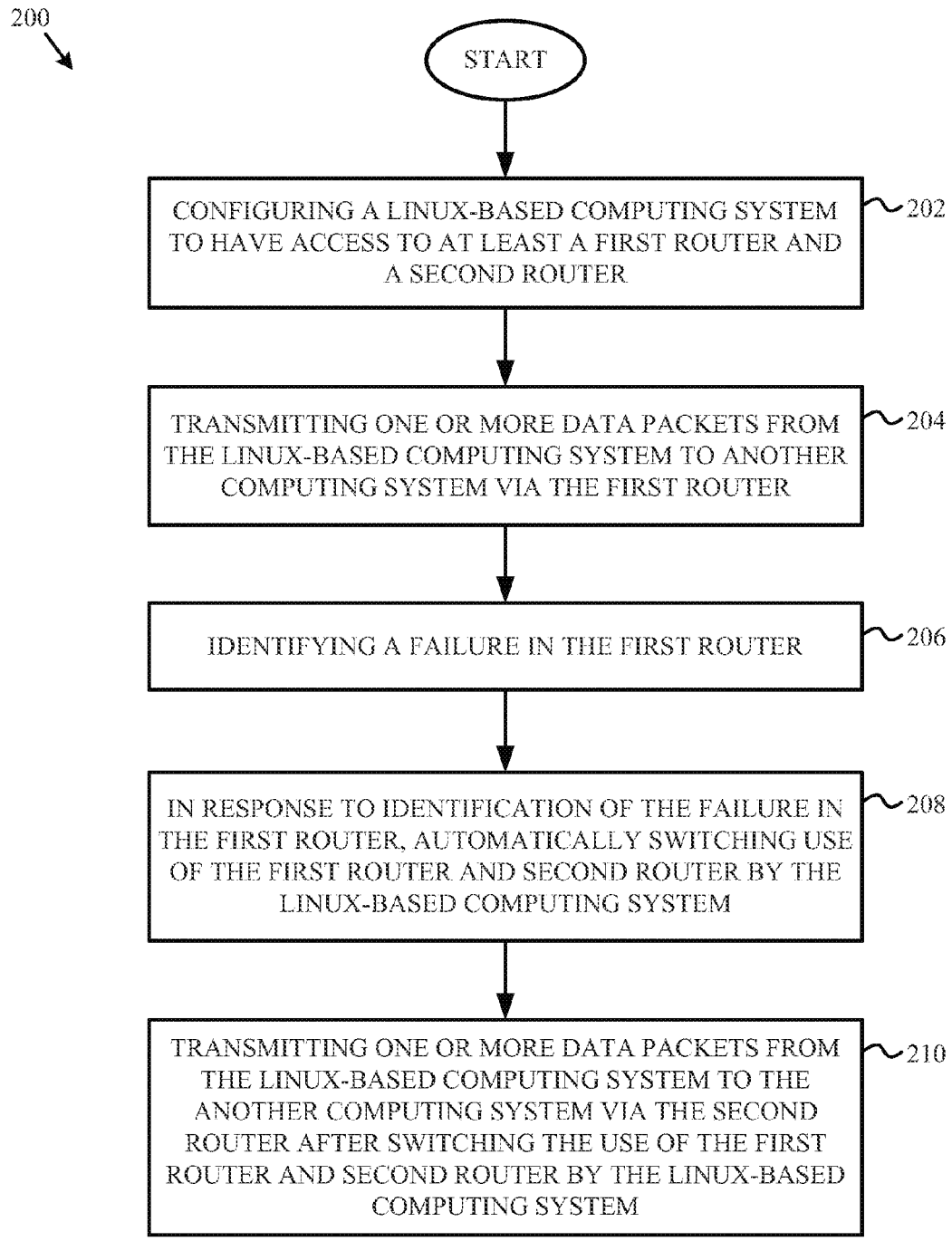
FIG. 2 is a flow chart illustrating a method for adaptive router failover in Linux-based computing systems according to one embodiment of the disclosure.

FIG. 2 is a flow chart illustrating a method for adaptive router failover in Linux-based computing systems according to one embodiment of the disclosure. It is noted that embodiments of method 200 may be implemented in accordance with the systems and embodiments described herein with respect to FIGS. 1 and 3. For example, embodiments of method 200 may be implemented by Linux-based computing system 102 or computing system 300. In general, embodiments of method 200 may be implemented by other similar systems without deviating from this disclosure so long as the systems, whether directly or indirectly, support the operations as described herein.

Specifically, method 200 includes, at block 202, configuring, by a processor, a Linux-based computing system to have access to at least a first router and a second router. For example, in one embodiment, with reference to FIG. 1, the Linux-based computing system 102 may be configured to have access to router 110A and router 110C by coupling routers 110A and 110C to the Linux-based computing system 102 through switch 108 and NIC 106 and configuring paths to the routers 110A and 110C on the Linux-based computing system 102. In some embodiments, the Linux-based computing system may also be installed with drivers to control the NIC 106 and switch 108.

At block 204, method 200 includes transmitting, by the processor, one or more data packets from the Linux-based computing system to another computing system via the first router. For example, in one embodiment, with reference to FIG. 1, Linux-based computing system 102 may be configured to communicate over network 112 via router 110A. Through such a configuration, Linux-based computing system 102 may communicate with other computing systems that have access to network 112. Thus, Linux-based computing system 102 may communicate with other computing systems that access network 112 by transmitting data packets via the first router 110A and network 112 to the other computing systems. Similarly, Linux-based computing system 102 may communicate with other computing systems that access network 112 by receiving data packets via router 110A and network 112 from other computing systems accessing network 112.

In some embodiments, the second router is not used to transmit the one or more data packets while the first router is used to transmit the one or more data packets from the Linux-based computing system to another computing system. For example, in one embodiment, with reference to FIG. 1, although Linux-based computing system 102 is coupled to both router 110A and router 110C, Linux-based computing system 102 may utilize only router 110A to manage communication between the Linux-based computing system 102 and other computing systems over the network 112. In the meantime, router 110C may be placed in an idle or standby mode, wherein it does not manage communication between the Linux-based computing system 102 and other computing systems over the network 112.

At block 206, method 200 includes identifying, by the processor, a failure in the first router. For example, in one embodiment, with reference to FIG. 1, Linux-based computing system 102 may identify a failure in router 110A, the router currently being used to manage communication between the Linux-based computing system 102 and other computing systems over the network 112. In some embodiments, identification of a failure in the first router may be effectuated through the use of ping operations. According to one embodiment, the first router may be repeatedly pinged to identify the failure in the first router.

In particular, in one embodiment, identifying a failure in the first router through the use of ping-like operations may include transmitting a test signal to the first router and determining if a reply is received from the first router in response to the transmitted test signal. For example, in one embodiment, with reference to FIG. 1, identifying a failure in router 110A by Linux-based computing system 102 may include the processor of the Linux-based computing system 102 transmitting a test signal to router 110A and determining if a reply is received from router 110A in response to the transmitted signal. In some embodiments, the test signal may be an Internet Control Message Protocol (ICMP) echo request and the reply may be an ICMP echo reply.

In some embodiments, a failure in the first router may be identified when a reply is determined to not have been received from the first router in response to the transmitted test signal. For example, in the embodiment of FIG. 1, if after the Linux-based computing system 102 has transmitted the test signal to router 110A the Linux-based computing system 102 determines that it did not receive a receive a reply, such as an ICMP echo reply, then the Linux-based computing system 102 may conclude that router 110A is experiencing a failure.

According to some embodiments, a failure in the first router may result from the first router losing power. In another embodiment, a failure in the first router may result from the first router being disconnected from the network. In another embodiment, a failure in the first router may result from the first router operating abnormally, such as, for example, by yielding invalid or incorrect operation due to a hardware or software failure.

Method 200 also includes, at block 208, in response to identification of the failure in the first router, automatically switching, by the processor, use of the first router and second router by the Linux-based computing system. For example, referring to the embodiment of FIG. 1, if the Linux-based computing system determines that router 110A, the router currently being used to manage communication between the Linux-based computing system 102 and other computing systems over the network 112, is experiencing a failure, then Linux-based computing system 102 may switch to router 110C to manage communication between the Linux-based computing system 102 and other computing systems over the network 112. In other words, in response to an identification of a failure in router 110A, the Linux-based computing system 102 may use router 110C to manage communication between the Linux-based computing system 102 and other computing systems over the network 112. In some embodiments, while router 110C is used to manage communication between the Linux-based computing system 102 and other computing systems over the network 112, router 110A may be placed in an idle or standby mode, wherein it does not manage communication between the Linux-based computing system 102 and other computing systems over the network 112.

In some embodiments, switching between the first router and the second router may include issuing a first computer instruction to modify a first preference metric associated with the first router and issuing a second computer instruction to modify a second preference metric associated with the second router. In some embodiments, the instructions used to modify the preference metrics may be ip route append instructions. According to some embodiments, after the first preference metric associated with the first router and the second preference metric associated with the second router, the second preference metric may be of a higher preference than the first preference metric.

As an example, and not limitation, of the switching, with reference to the embodiment of FIG. 1, router 110A may be associated with a first preference metric and router 110C may be associated with a second preference metric. As long as router 110A has not experienced an error, Linux-based computing system 102 may use router 110A to manage communication between the Linux-based computing system 102 and other computing systems over the network 112. While router 110A is used to manage communication between the Linux-based computing system 102 and other computing systems over the network 112, for example, by managing the transmission of data packets from the Linux-based computing system 102 to other computing systems over network 112, router 110C may be placed in a standby or idle mode so that it is not used to manage communication between the Linux-based computing system 102 and other computing systems over the network 112. In such a case in which router 110A, and not router 110C, is used to manage communication between the Linux-based computing system 102 and other computing systems over the network 112, the first preference metric associated with router 110A may be of a higher preference than the second preference metric associated with router 110C. By setting the first preference metric associated with router 110A to a higher preference than the second preference metric associated with router 110C, the Linux-based computing system 102 knows that router 110A, and not router 110C, should be used to manage communication between the Linux-based computing system 102 and other computing systems over the network 112. However, when the Linux-based computing system 102 determines that a switch between routers is necessary so as to use router 110C instead of router 110A to manage communication between the Linux-based computing system 102 and other computing systems over the network 112, for example, because router 110A is determined to be experiencing a failure, the Linux-based computing system 102 may modify the preference metrics associated with the routers to effectuate the switch. For example, the Linux-based computing system 102 may issue instructions that modify the preference metrics so that after modification the second preference metric associated with router 110C is of a higher preference than the first preference metric associated with router 110A. By setting the second preference metric associated with router 110C to a higher preference than the first preference metric associated with router 110A, the Linux-based computing system 102 knows that router 110C, and not router 110A, should be used to manage communication between the Linux-based computing system 102 and other computing systems over the network 112.

At block 210, method 200 includes transmitting, by the processor, one or more data packets from the Linux-based computing system to another computing system via the second router after switching the use of the first router and second router by the Linux-based computing system. For example, in one embodiment, with reference to FIG. 1, after the Linux-based computing system 102 has switched from router 11A to router 110C, the Linux-based computing system 102 may use router 110C to manage communication between the Linux-based computing system 102 and other computing systems over the network 112, for example, by managing the transmission of data packets from the Linux-based computing system 102 to other computing systems over network 112.

According to an embodiment, the first router may not be used to transmit the one or more data packets while the second router is used to transmit the one or more data packets from the Linux-based computing system to another computing system. As an example with reference to FIG. 1, and not a limitation, while router 110C is used to manage communication between the Linux-based computing system 102 and other computing systems over the network 112, for example, by managing the transmission of data packets from the Linux-based computing system 102 to other computing systems over network 112, router 110A may be placed in a standby or idle mode so that it is not used to manage communication between the Linux-based computing system 102 and other computing systems over the network 112.

In some embodiments, use of the first router and second router by the Linux-based computing system may be switched when a failure is identified in the second router and no failure is identified in the first router. In other words, once a switch from the first router, such as router 110A, to the second router, such as router 110C, has occurred, the Linux-based computing system is not restricted from using the first router again when the second router experiences a failure and the first router has been cleared of any failures so as to return to normal operating conditions. Thus, the entire discussion relating to use of the first router, identification of failures in the first router, and switching from the first router to the second router is applicable to use of the second router, identification of failures in the second router, and switching from the second router back to the first router.

The schematic flow chart diagram of FIG. 2 is generally set forth as a logical flow chart diagram. As such, each depicted order and labeled steps are indicative of one embodiment of the disclosed method. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Figure 3:
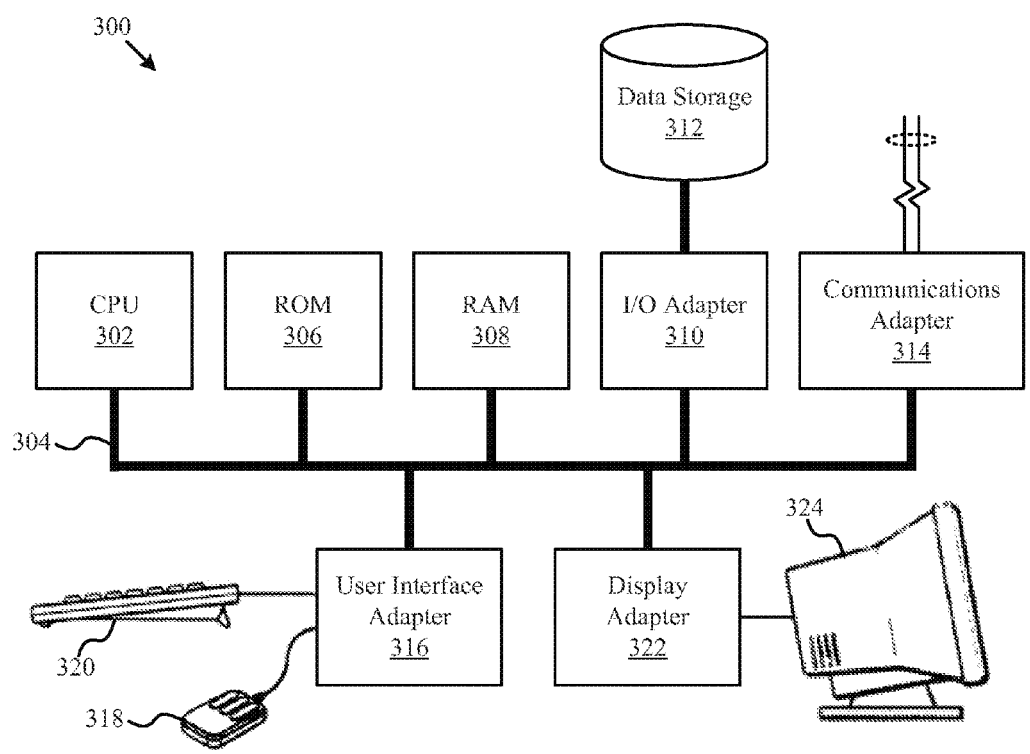
FIG. 3 is a block diagram illustrating a computing system according to one embodiment of the disclosure.

FIG. 3 illustrates a computer system 300 adapted according to certain embodiments of a server, Linux-based computing system, and/or a user interface device. The central processing unit ("CPU") 302 is coupled to the system bus 304. The CPU 302 may be a general purpose CPU or microprocessor, graphics processing unit ("GPU"), and/or microcontroller. Thus, a processor as disclosed herein may refer to a single processor or multiple processors operating in a collaborative fashion as one processor. The present embodiments are not restricted by the architecture of the CPU 302 so long as the CPU 302, whether directly or indirectly, supports the operations as described herein. The CPU 302 may execute the various logical instructions according to the present embodiments.

The computer system 300 may also include random access memory (RAM) 308, which may be synchronous RAM (SRAM), dynamic RAM (DRAM), synchronous dynamic RAM (SDRAM), or the like. The computer system 300 may utilize RAM 308 to store the various data structures used by a software application. The computer system 300 may also include read only memory (ROM) 306 which may be PROM, EPROM, EEPROM, optical storage, or the like. The ROM may store configuration information for booting the computer system 300. The RAM 308 and the ROM 306 hold user and system data, and both the RAM 308 and the ROM 306 may be randomly accessed.

The computer system 300 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300. In a further embodiment, the display adapter 322 may display a graphical user interface (GUI) associated with a software or web-based application on a display device 324, such as a monitor or touch screen.

The I/O adapter 310 may couple one or more storage devices 312, such as one or more of a hard drive, a solid state storage device, a flash drive, a compact disc (CD) drive, a floppy disk drive, and a tape drive, to the computer system 300. According to one embodiment, the data storage 312 may be a separate server coupled to the computer system 300 through a network connection to the I/O adapter 310.

The communications adapter 314 may be adapted to couple the computer system 300 to a network, which in some embodiments may be one or more of a LAN, WAN, and/or the Internet. For example, in one embodiment, communications adapter 314 may couple to switches and/or a routers, such as switch 108 and routers 110 of FIG. 1, to manage communication between computer system 300 and a network.

The user interface adapter 316 couples user input devices, such as a keyboard 320, a pointing device 318, and/or a touch screen (not shown) to the computer system 300. The display adapter 322 may be driven by the CPU 302 to control the display on the display device 324. Any of the devices 302-322 may be physical and/or logical.

The applications of the present disclosure are not limited to the architecture of computer system 300. Rather the computer system 300 is provided as an example of one type of computing system that may be adapted to perform the functions of a server, Linux-based computing system, and/or the user interface device. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 300 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data may be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for adaptive router failover in Linux-based computing systems, comprising:
   configuring, by a processor of a Linux-based computing system, the Linux-based computing system to have access to at least a first router and a second router, via a switch;
   transmitting, by the processor, one or more data packets from the Linux-based computing system to another computing system via the switch and only the first router, wherein the second router is not used to transmit the one or more data packets while the first router is used to transmit the one or more data packets from the Linux-based computing system to the another computing system;
   identifying, by the processor, a failure in the first router by a ping-like operation between the Linux-based computing system and the first router;
   in response to identification of the failure in the first router, automatically switching, by the processor, use of the first router and second router, via the switch, by the Linux-based computing system; and
   transmitting, by the processor, one or more data packets from the Linux-based computing system to the another computing system via the switch and only the second router after switching the use of the first router and second router by the Linux-based computing system, wherein the first router is not used to transmit the one or more data packets while the second router is used to transmit the one or more data packets from the Linux-based computing system to the another computing system.

2. The method of claim 1, wherein identifying by the ping-like operation comprises:
   transmitting a test signal to the first router; and
   determining if a reply is received from the first router in response to the transmitted test signal.

3. The method of claim 2, wherein the test signal is an Internet Control Message Protocol (ICMP) echo request and the reply is an ICMP echo reply.

4. The method of claim 2, wherein a failure in the first router is identified when a reply is determined to not have been received from the first router in response to the transmitted test signal.

5. The method of claim 1, wherein switching comprises:
   issuing a first computer instruction to modify a first preference metric associated with the first router; and
   issuing a second computer instruction to modify a second preference metric associated with the second router, wherein, after modification, the second preference metric is of a higher preference than the first preference metric.

6. The method of claim 1, wherein the failure in the first router comprises at least one of a loss of power, disconnection from a network, and abnormal operation.

7. The method of claim 1, further comprising switching use of the first router and second router by the Linux-based computing system when a failure is identified in the second router and no failure is identified in the first router.

8. A computer program product, comprising:
   a non-transitory computer readable medium comprising instructions which, when executed by a processor of a computer system, cause the processor to perform the steps of:

configuring a Linux-based computing system to have access to at least a first router and a second router, via a switch;

transmitting one or more data packets from the Linux-based computing system to another computing system via the switch and only the first router, wherein the second router is not used to transmit the one or more data packets while the first router is used to transmit the one or more data packets from the Linux-based computing system to the another computing system;

identifying a failure in the first router by a ping-like operation between the Linux-based computing system and the first router;

in response to identification of the failure in the first router, automatically switching use of the first router and second router by the Linux-based computing system, via the switch; and transmitting one or more data packets from the Linux-based computing system to the another computing system via the switch and only the second router after switching the use of the first router and second router by the Linux-based computing system, wherein the first router is not used to transmit the one or more data packets while the second router is used to transmit the one or more data packets from the Linux-based computing system to the another computing system.

9. The computer program product of claim 8, wherein identifying by the ping-like operation comprises instructions which cause the processor to perform the steps of:

transmitting a test signal to the first router; and determining if a reply is received from the first router in response to the transmitted test signal.

10. The computer program product of claim 9, wherein the test signal is an Internet Control Message Protocol (ICMP) echo request and the reply is an ICMP echo reply.

11. The computer program product of claim 9, wherein a failure in the first router is identified when a reply is determined to not have been received from the first router in response to the transmitted test signal.

12. The computer program product of claim 8, wherein switching comprises instructions which cause the processor to perform the steps of:

issuing a first computer instruction to modify a first preference metric associated with the first router; and issuing a second computer instruction to modify a second preference metric associated with the second router, wherein, after modification, the second preference metric is of a higher preference than the first preference metric.

13. The computer program product of claim 8, wherein the failure in the first router comprises at least one of a loss of power, disconnection from a network, and abnormal operation.

14. The computer program product of claim 8, wherein the medium further comprises instructions which cause the processor to perform the step of switching use of the first router and second router by the Linux-based computing system when a failure is identified in the second router and no failure is identified in the first router.

15. An apparatus, comprising:

a memory; and a processor coupled to the memory, wherein the processor is further configured to perform the steps of:

configuring a Linux-based computing system to have access to at least a first router and a second router, via a switch;

transmitting one or more data packets from the Linux-based computing system to another computing system via the switch and the only first router, wherein the second router is not used to transmit the one or more data packets while the first router is used to transmit the one or more data packets from the Linux-based computing system to the another computing system;

identifying a failure in the first router by a ping-like operation between the Linux-based computing system and the first router;

in response to identification of the failure in the first router, automatically switching use of the first router and second router via the switch, by the Linux-based computing system; and transmitting one or more data packets from the Linux-based computing system to the another computing system via the switch and only the second router after switching the use of the first router and second router by the Linux-based computing system, wherein the first router is not used to transmit the one or more data packets while the second router is used to transmit the one or more data packets from the Linux-based computing system to the another computing system.

16. The apparatus of claim 15, wherein identifying by the ping-like operation comprises the processor being further configured to perform the steps of:

transmitting a test signal to the first router; and determining if a reply is received from the first router in response to the transmitted test signal.

17. The apparatus of claim 16, wherein the test signal is an Internet Control Message Protocol (ICMP) echo request and the reply is an ICMP echo reply.

18. The apparatus of claim 16, wherein a failure in the first router is identified when a reply is determined to not have been received from the first router in response to the transmitted test signal, and wherein the failure in the first router comprises at least one of a loss of power, disconnection from a network, and abnormal operation.

19. The apparatus of claim 15, wherein switching comprises the processor being further configured to perform the steps of:

issuing a first computer instruction to modify a first preference metric associated with the first router; and issuing a second computer instruction to modify a second preference metric associated with the second router, wherein, after modification, the second preference metric is of a higher preference than the first preference metric.

20. The apparatus of claim 15, wherein the processor is further configured to perform the steps of switching use of the first router and second router by the Linux-based computing system when a failure is identified in the second router and no failure is identified in the first router.

* * * * *